US005849219A

United States Patent [19]

De Laat et al.

[11] Patent Number: 5,849,219
[45] Date of Patent: Dec. 15, 1998

[54] AQUEOUS DISPERSION OF PARTICLES

[75] Inventors: Antonius W. M. De Laat; Hermannus F. M. Schoo, both of Eindhoven, Netherlands

[73] Assignee: U.S. Philips Corporation, New York, N.Y.

[21] Appl. No.: 787,716

[22] Filed: Jan. 24, 1997

Related U.S. Application Data

[63] Continuation of Ser. No. 420,273, Apr. 11, 1995, abandoned.

[30] Foreign Application Priority Data

Apr. 13, 1994 [EP] European Pat. Off. .............. 94201006

[51] Int. Cl.$^6$ .............................. B01J 13/00; B03B 1/04; B03D 3/06
[52] U.S. Cl. ............................. 252/313.1; 106/447; 209/5; 252/303; 252/346; 526/332; 526/333; 526/932
[58] Field of Search ................................ 252/131.1, 303; 106/447; 524/413, 800, 423, 529, 533; 526/332, 333, 932; 209/5

[56] References Cited

U.S. PATENT DOCUMENTS

| | | | |
|---|---|---|---|
| 1,595,052 | 8/1926 | Acheson | 252/313.1 |
| 3,004,858 | 10/1961 | Sheehan et al. | 106/447 X |
| 3,532,662 | 10/1970 | Ansdell | 524/923 |
| 3,761,438 | 9/1973 | Schultz | 526/332 X |
| 3,801,524 | 4/1974 | Parker | 524/533 X |
| 4,177,081 | 12/1979 | De Colibus | 106/447 |
| 4,243,430 | 1/1981 | Sperry et al. | 524/423 X |
| 4,277,384 | 7/1981 | Arkens | 524/533 X |
| 5,051,199 | 9/1991 | Barwise | 209/5 X |

OTHER PUBLICATIONS

Svedberg: *Colloid Chemistry,* Second Edition, Book Dep't., The Chemical Catalog Co. Inc., New York (1928) pp. 263 & 264. [QD 549 592 1928.].

*Primary Examiner*—Richard D. Lovering
*Attorney, Agent, or Firm*—Norman N. Spain

[57] ABSTRACT

The invention relates to a stable aqueous dispersion of particles which can be flocculated by increasing the temperature to a value above the transition temperature. The invention is characterized in that the dispersion comprises a polymer selected from the group consisting of polyvinyl methyl ether and a block copolymer of polyvinyl methyl ether and a polyvinyl ether, the ether group bonded to the main chain via the oxygen atom being adsorbed onto the surface of the particles. The invention also relates to a block polymer of the above-mentioned type and to a method of manufacturing such a block copolymer. The invention enables very fine powders of ceramic particles having a very high homogeneity to be obtained.

4 Claims, No Drawings

AQUEOUS DISPERSION OF PARTICLES

This is a continuation of application Ser. No. 08/420,273, filed Apr. 11, 1995 and now abandoned.

BACKGROUND OF THE INVENTION

The invention relates to a stable aqueous dispersion of particles which can be flocculated by increasing the temperature to a value above a transition temperature.

In many important technological processes, particles must be separated from aqueous dispersions. The diameter of the dispersed particles may vary within wide limits and ranges, for example, from several tenths of a micrometer to several micrometers. Drainage of such dispersions, for example by filtration processes, can be effected much more efficiently if the particles can agglomerate into larger, readily flocculating structures, i.e. said structures are precipitated in the aqueous dispersion. Such a separation process, also referred to as dewatering process or draining process, is for example carried out in the paper industry to purify waste water or to dewater biological or bacterial suspensions.

An important field of application is the manufacture of powders, more particularly ceramic powders, from oxidic materials. In the manufacture of such ceramic powders, the constituent oxidic particles, in particular particles of oxides of various types of metals, must be mixed very thoroughly. Said mixing takes place by dispersing the particles in water and, simultaneously or subsequently, mixing said particles thoroughly in a mixer. During mixing of said metal-oxide particles, flocculation or precipitation of said particles is not permitted because this would eventually lead to an inhomogeneous mixture of particles. This has a negative effect on the properties of the eventual ceramic powder. For process-technical reasons it must further be possible to allow the dispersion obtained after mixing to stand for some time (residence time) without this leading to inhomogeneities as a result of, for example, different flocculation rates of the various metal-oxide particles.

SUMMARY OF THE INVENTION

Therefore, it is an object of the invention to provide, on the one hand, a stable dispersion of particles in water and, on the other hand, allow such a stable dispersion to flocculate in the simplest possible manner, while using a minimum number of auxiliary means. The invention particularly aims at flocculating the stable dispersion by increasing the temperature.

In accordance with the invention, this object is achieved by using an aqueous dispersion of particles which comprises a polymer selected from the group consisting of polyvinyl methyl ether and a block copolymer of polyvinyl methyl ether and a polyvinyl ether, the ether group, which is bonded to the main chain via the oxygen atom, being adsorbed onto the surface of the particles.

DETAILED DESCRIPTION OF THE INVENTION

For a more complete understanding the invention will now be described in greater detail.

In experiments leading to the invention it has surprisingly been found that polymethyl ethyl ether (PVME) is sufficiently adsorbed onto particles in an aqueous medium, particularly onto particles of metal oxides, such as in particular (mixtures of) particles of $PbO$, $ZrO_2$, $TiO_2$, $WO_3$, $La_2O_3$, $MgO$ etc. It has also surprisingly been found that the solubility of PVME in water, from the adsorbed state, is such that the PVME molecules or segments of molecules extend from the particle over a distance and in a concentration in the solution which are sufficient to exhibit the so-called steric hindrance and hence stabilize the dispersion. By means of PVME a right, yet subtle, balance is achieved between, on the one hand, a satisfactory adsorption onto the surface of the particles to be dispersed and, on the other hand, a sufficient steric effect caused by a development (unravelling) of the molecule chains in the solution.

It is noted that stabilization of dispersions on the basis of steric hindrance is a physical phenomenon which is known per se and which can be explained by means of theories about osmotic pressure. If two particles, the surfaces of which comprise polymer molecules projecting into the solution, approach each other, the concentration of polymer molecules or segments thereof will increase in the area between said particles. As a result, the osmotic pressure locally rises in this area, so that liquid of the solvent is attracted to compensate for the difference in concentration. This causes the particles to be dispersed, which leads to a stabilization of the dispersion.

The surface of the particles present in the dispersion in accordance with the invention can be provided with PVME in a simple manner by adding a small quantity of PVME, preferably in a concentration of 0.5–20 mg PVME per $m^2$ of particle area, to the aqueous dispersion.

The stable aqueous dispersion in accordance with the invention can be flocculated by increasing the temperature of the dispersion. The particles agglomerate at a transition temperature of approximately 35° C. and the precipitate obtained can be isolated by filtration and subsequently dried, resulting in a very thoroughly mixed powder of the above-mentioned oxides.

Flocculation of the particles and the resultant break-up of the stable dispersion at 35° C. is caused by the fact that the molecular chains of the PVME adsorbed onto the particles, which chains initially project into the solution, withdraw to or deposit on the surface of the particles. This results in a reduction of steric hindrance such that flocculation takes place.

A very interesting and special aspect is that a temperature increase suffices to bring about flocculation. The increase in temperature is only small, which has a favourable effect on the energy consumption in this process. Flocculation can thus be brought about without adding salts, such as NaCl, or admixing an organic solvent. If desired, water-soluble salts can of course be added to the inventive dispersion to accelerate the flocculation process. Water-miscible organic solvents, in particular alcohols, can also be added to the inventive dispersion if it is necessary to increase the transition temperature, for example, from 31° C. to 40° C. or higher.

A stable dispersion in accordance with the invention can also be obtained by employing a dispersion comprising a polymer in the form of a block copolymer of polyvinyl methyl ether and a polyvinyl ether of which the ether group bonded to the main chain via the oxygen atom is adsorbed onto the surface of the particles. This block copolymer will hereinafter also be referred to as PVME-PVER. PVER denotes the part of the polymer chain which comprises substituted or unsubstituted polyvinyl ether. The term "block" is used to refer to a block copolymer in which a first part (block) of the polymer chain comprises exclusively or substantially exclusively PVME, and a second part of the polymer chain, which is connected to the first part, comprises exclusively or substantially exclusively PVER. The expression "substantially exclusively" is to be understood to mean that a small quantity of another monomer, such as vinyl methyl ether, may be present in the relevant block.

The copolymer thus comprises two blocks. The PVER block is the so-called anchor block. This block is used to bond the copolymer to the surface of the dispersed particle. In particular the choice of the substituent R enables the degree of adsorption of the anchor block onto the particle to be controlled. By modifying R, the anchor block can be bonded to a large variety of particles, in particular particles of widely varying oxidic materials, such as those mentioned hereinabove. Since the anchor block is specially designed and intended for bonding the copolymer to the surface of particles, the use of the block copolymer is generally more effective than the use of the homopolymer PVME. Also the spectrum (variety) of particles onto which adsorption takes place is greater when the block copolymer is used.

The second block of the block copolymer is the PVME block. This block will hereinafter also be referred to as dissolving block. The molecules of this block extend from the anchor block on the surface of the particle into the aqueous dispersion and ensure that the steric hindrance obtained below 35° C. is so good that the dispersion is stabilized. When the temperature of the dispersion is increased to a value above 35° C. (transition point) flocculation of the dispersion takes place immediately because the molecules of the dissolving block settle on the surface of the particle, so that steric hindrance is eliminated or at least substantially eliminated.

Good results are obtained by using a block copolymer in accordance with formula (I)

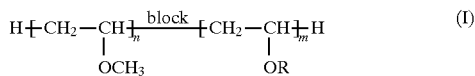

wherein

R is an organic residual group which is adsorbed onto the surface of the particles, n=10–10,000, m=2–500, and the ratio of n:m ranges between 1:1 and 500:1.

It is noted that the value of n is substantially higher than that of m. This means that the length of the chain of the dissolving block substantially exceeds that of the anchor block. A suitable value of n ranges, in particular, between 50 and 5,000 and preferably of from 100 to 1,000. A suitable value of m ranges between 5 and 250, and in particular between 10 and 100.

This applies in particular to a block copolymer of the above formula (I), wherein the substituent R represents a hydrocarbon group which may optionally be substituted with an acid residue or salts thereof, a substituted or unsubstituted amino group, a heterocyclic group having at least one nitrogen atom in the ring structure, an alkoxy group aryloxy group.

A very suitable block copolymer corresponds to the formula (I), wherein R is an aliphatic carboxylic acid having 1–20 C-atoms, preferably 1–6 C-atoms.

The above-mentioned block copolymer in accordance with formula (I) is a novel substance. The invention also relates to this substance, which can be used as a dispersing agent in aqueous dispersions at a temperature below the transition temperature and which serves as a flocculent at a temperature above the transition temperature.

The compound in accordance with formula (I) can be manufactured by polymerizing at a low temperature a solution of methyl vinyl ether in an organic solvent in the presence of an initiator, and reacting the reaction product at a low temperature, in the presence of an organic solvent, with a compound of the formula $H_2C=CH—O—R'$, wherein R' is an organic residual group or an intermediary substitutent which can be converted into the organic residual group.

A solvent which can suitably be used in the manufacture of the inventive block copolymer is, for example, a chlorinated hydrocarbon, such as dichloromethane, or an alkane, such as hexane. An example of a suitable intermediary substituent is an alkyl ester of an aliphatic dicarboxylic acid, such as in particular ethyl malonate.

The reaction scheme of the manufacture of a block copolymer in accordance with formula (I), wherein R is an aliphatic carboxylic acid having 3 C-atoms is represented by the following reaction equations:

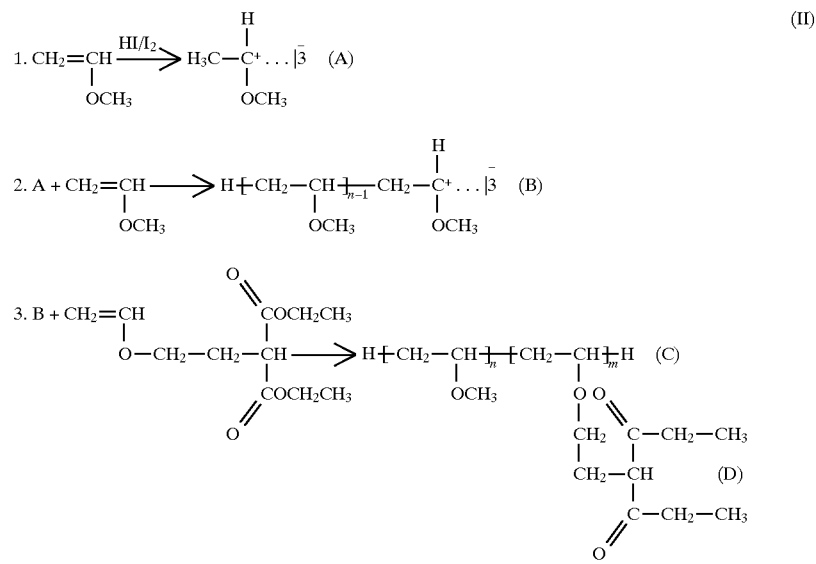

-continued

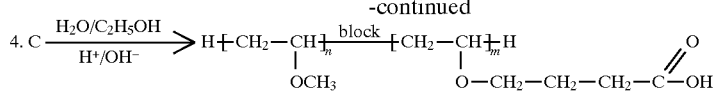

The reaction 1. is an initiation reaction which is carried out by means of the initiator system of HI and $I_2$ in the solvent dichloromethane and hexane.

Reaction 2. is the propagation process in which the polymer chain of PVME (dissolving block) is manufactured.

Diethyl(2-(vinyloxy)ethyl)malonate is subsequently added to the polymeric reaction product (B), thereby forming the block copolymer (C) in accordance with reaction 3.

By hydrolysing the last-mentioned product in an alkaline or acidified water-alcohol mixture in accordance with reaction 4, apart from hydrolysis, decarboxylation also takes place, resulting in the desired block copolymer of the formula (II).

The invention further relates to a method of manufacturing a homogeneous powder mixture, in which method solid starting material is ground to form small particles which are dispersed in an aqueous medium comprising polyvinyl methyl ether or a block copolymer of polyvinyl methyl ether and a polyvinyl ether, the ether group, which is bonded to the main chain via the oxygen atom, being adsorbed onto the surface of the particle, whereafter the stable aqueous dispersion obtained is heated to a temperature above the transition temperature, so that the dispersed particles agglomerate and flocculate, after which the sediment obtained is separated.

The method in accordance with the invention is of particular importance for the manufacture of, in particular, ceramic powders. Ceramic powders are often used for the manufacture of electronic components, such as multilayer ceramic capacitors and actuators, for example piezo-electric actuators. It is very important that the ceramic powders used for this purpose are of a very homogeneous composition. This is achieved by means of the above method in accordance with the invention.

The grinding process is carried out in a ball mill in which water is added to the solid ceramic material to be ground, so that a homogeneous slurry (dispersion) is obtained. In accordance with the invention, PVME or preferably the above-mentioned block copolymer of the PVME-PVER-type is added to the slurry. In this manner, a stable and homogeneous dispersion is obtained which does not exhibit undesired and untimely flocculation or partial flocculation. Without this measure in accordance with the invention, uncontrolled precipitation takes place to a greater or lesser degree, resulting in an inhomogeneous final product. In accordance with the inventive method, instantaneous flocculation of the homogeneous dispersion can subsequently be brought about by merely increasing the temperature. This is very important because it enables a homogeneous sediment to be obtained. If, unlike the invention, flocculation would take a good length of time or would only partially take place, the sediment obtained is inhomogeneous.

Therefore, the method in accordance with the invention is based on two essential process steps, i.e. a) the manufacture of a stable dispersion which does not precipitate or flocculate and b) instantaneous and complete flocculation of this dispersion by simply increasing the temperature. The solid ceramic material used in the method in accordance with the invention can be manufactured in known manner by sintering a homogeneous mixture of the constitutuent inorganic elements, such as metal oxides, at a high temperature.

The method in accordance with the invention can also very suitably be used for the manufacture of such a homogeneous mixture of constituent elements. To this end, the particles of the constituent elements are ground and dispersed in an aqueous medium to which PVME or, preferably, the block copolymer is added. In this manner, a stable dispersion is obtained. Flocculation of certain constituents, which would render the final product inhomogeneous, is negligible. When the temperature is increased, the dispersion flocculates instantaneously. The sediment obtained can easily be separated by filtration. The filter cake obtained is of a very homogeneous composition and, after having been broken, it can be subjected to the above-mentioned sintering process to manufacture ceramic material.

The invention will be explained by means of the exemplary embodiment.

Exemplary embodiment:

1. Manufacture of the block copolymer in accordance with formula (II) of the

A quantity of 48 grams of methyl vinyl ether (MVE) was added to 150 ml dichloromethane in a protective gas (argon) at −20° C. After cooling to −70° C., 2.6 ml of a 0.53M solution of HI in hexane was added. Subsequently, 350 mg of solid $I_2$ was added. The solution was lowly heated to −30° C. After 18 hours, no MVE could be detected in the gas chromatogram, and 15.9 grams diethyl(2-(vinyloxy)ethyl) malonate were added. After reacting for 18 hours at −30° C., the reaction mixture was quenched by adding cooled methanol/ammonia. The solution was washed with 10% $Na_2S_2O_3$ in water and with demineralized water (2×). After evaporation of the solution, the polymer was analysed by means of NMR, in which process the ratio of the block lengths n:m was found to be 10:4. The malonate ester groups were hydrolysed by heating an alkaline solution (in water/ethanol=9.8:1) to 50° C. for 30 minutes. After dialysis and evaporation of the aqueous solution, it was found that the malonic acid ester block had hydrolysed completely (NMR).

A series of block copolymers of increasing PVME block length n were prepared, the block length m of the anchor block being maintained at a substantially constant value (see Table 1).

TABLE 1

| Polymer Ref. no. | n/m used | calculated n/m (NMR) | $M_n$ | D |
|---|---|---|---|---|
| 1 | 400/50 | 390/60 | 20,000 | 1,1 |
| 2 | 200/50 | 190/60 | 12,000 | 1,2 |
| 3 | 600/50 | 590/60 | 25,000 | 1,3 |
| 4 | 100/50 | 80/70 | not determined | not determined |

In Table 1, $M_n$ stands for the average molecular weight and D stands for the polydispersity.

2. Stabilization and flocculation of aqueous dispersions of oxides by using the block copolymer 3.

A quantity of 100 mg of a powder of the oxides listed in Table 2 (column 2), given below, were dispersed by ultrasonic vibration in 1.5 g of an aqueous solution of the block copolymer 3 of Table 1, in a quantity given in column 3 of Table 2. The quality and stability of the dispersions obtained were subsequently examined under a microscope. The results are listed in column 4 of Table 2. In a further series of tests, the dispersions were heated to 50° C. to bring about flocculation of the dispersions. The results were examined under a microscope and are listed in column 5.

TABLE 2

| sample no. | oxide | added block copolymer in mg/g oxide | stability of the dispersion | flocculation at 50° C. |
|---|---|---|---|---|
| 1 | PbO | 0 | – | – |
| 2 | PbO | 44 | ++ | + |
| 3 | ZrO$_2$ | 0 | – | – |
| 4 | ZrO$_2$ | 39 | ++ | + |
| 5 | TiO$_2$ | 0 | – | – |
| 6 | TiO$_2$ | 33 | +± | + |
| 7 | mixture of oxides | 0 | +– | – |
| 8 | mixture of oxides | 33 | ++ | + |

The stability of the dispersions is indicated by symbols which have the following meaning:

++=excellent quality. Only Brownian particles.

+±=very good quality. Brownian particles with a few agglomerates.

+–=sufficiently good quality. Brownian particles with several relatively large agglomerates.

– –=poor quality. Predominantly relatively large agglomerates.

The symbols relating to flocculation have the following meaning:

+=complete flocculation (maximum effect).

±=substantial degree of flocculation (good effect).

–=no flocculation (no effect).

In addition to the oxides relating to sample nos. 1, 3 and 5, said "mixture of oxides" also comprises a small quantity of tungsten oxide and lanthanum oxide.

3. Stabilization and flocculation of a ceramic powder

A mixture of oxides, as mentioned hereinabove, was sintered at an increased temperature. The ceramic product obtained was ground in a ball mill, while adding water comprising different quantities of the block copolymer 3, until a particle size of several microns was attained. The dispersion thus obtained comprised 0.5 g of the ceramic product per gram of dispersion. The stability of the dispersions was determined by means of samples which were examined under a microscope. The temperature of the dispersion was increased to 50° C., at which temperature, dependent upon the quantity of block copolymer added, flocculation took place. Samples were taken to study the flocculation under a microscope. The flocculated dispersions could easily be completely filtrated and separated on a filter cloth in several minutes. If the block copolymer was not added to the initial dispersion, flocculation, i.e. agglomeration of particles, did not take place or only to a negligibly small degree when the temperature was increased as described hereinabove. This dispersion was difficult to filter off, while a filtering time of approximately forty-five minutes was required. In addition, it was found that a substantial part of the oxide mixture passed through the filter.

The results of the above-mentioned examination of the samples are listed in Table 3. Column 2 gives the quantity of block copolymer added. Column 3 gives the quality of the dispersion. The degree of flocculation as a result of the temperature increase to 50° C. is listed in column 4. Finally, the filterability of the heated dispersions is listed in column 5.

TABLE 3

| sample no. | mg block copolymer per g of ceramic material | stability of dispersion | flocculation after temperature increase | filterability of heated dispersion |
|---|---|---|---|---|
| 1 | 0 | – | – | ± |
| 2 | 3,5 | – | – | ± |
| 3 | 6,8 | ± | + | + |
| 4 | 9,9 | ± | + | + |
| 5 | 12,8 | + | + | + |
| 6 | 15,8 | + | + | + |
| 7 | 19,2 | + | + | + |
| 8 | 31,9 | + | + | + |

The symbols have the following meaning:
stability of the dispersion:

–=poor stability. No Brownian particles.

±=reasonable stability. Up to 50% of the particles exhibit Brownian movement.

+=excellent stability. All particles exhibit Brownian movement.

Flocculation after temperature increase:

–=no effect.

+=excellent effect; complete flocculation.

Filterability:

–=poor filterability.

±=reasonable filterability.

+=excellent filterability.

As shown in Table 3, the samples 1 and 2 still exhibited a reasonable filterability. This can be attributed to the fact that the dispersion has a poor stability. This means that a part of the initial dispersion has already flocculated. An increase in temperature has no effect on the flocculation. Owing to the poor stability of the dispersion, the sediment obtained is not optimally homogeneous.

Table 3 further shows that, in order to obtain optimum results, the ceramic powder used requires a minimum quantity of block copolymer of approximately 10 mg per gram of ceramic powder.

4. Influence of the concentration of PVME on the stability and flocculation of an aqueous dispersion of a mixture of oxides A powdered mixture of metal oxides, as mentioned in exemplary embodiment 1 (Table 2), was ground, while adding water, and mixed in a ball mill. As mentioned in Table 4 (column 2), different quantities of PVME were added to the water. The slurry (dispersion) obtained was ground until an average particle size of approximately 2 microns was obtained. The quantity by weight of metal oxides in the slurry was 0.5 g per gram of slurry. Samples were taken to determine the dispersion stability under a microscope. In this examination, the quantity of stabilized particles, i.e. particles exhibiting Brownian movement, also referred to as Brownian particles, were determined as well as the quantity of agglomerated, and hence unstable, particles. The temperature of a dispersion was increased to 50° C. Samples were taken to determine whether and to which degree flocculation of the dispersion takes place as a result of said temperature increase. The heated mixture was filtered over a filter cloth to determine the filterability. The results are shown in Table 4.

TABLE 4

| sample no. | mg PVME per g of oxides | stability of the dispersion | flocculation after temperature increase | filterability of heated dispersion |
|---|---|---|---|---|
| 1 | 0 | — | − | ± |
| 2 | 2,7 | — | − | ± |
| 3 | 5,3 | ± | ± | ± |
| 4 | 7,7 | +− | ± | + |
| 5 | 10,0 | +± | + | + |
| 6 | 13,0 | ++ | + | + |
| 7 | 26,0 | ++ | + | + |
| 8 | 41,0 | ++ | + | + |
| 9 | 54,0 | ++ | + | + |

The symbols used have the following meaning.
Stability of the dispersion:
−−=totally unstable; no Brownian particles.
±=less than half the particles are Brownian.
+−=half the particles are Brownian.
+±=almost all particles are Brownian.
++=all particles are Brownian (optimally stable).
Flocculation after temperature increase:
−=no effect; no flocculation as a result of temperature increase.
±=substantially complete flocculation.
+=complete flocculation.
Filterability of sediment:
±=reasonable filterability.
+=excellent filterability.

As regards the reasonable filterability of the samples 1 and 2, the same comment as given for the samples 1 and 2 of exemplary embodiment 3 applies.

Table 4 shows that a quantity of 10 mg PVME per gram of oxides is necessary to obtain optimum results when the mixture of oxides is dispersed and flocculated.

We claim:

1. A stable aqueous dispersion of particles, which dispersion can be flocculated by increasing its temperature to a value above a transition temperature, said dispersion, in addition to said particles, comprising a polymer selected from the group consisting of polyvinyl methyl ether and a block copolymer of polyvinyl methyl ether and an other polyvinyl ether, said polymer being absorbed onto the surface of the particles via oxygens of the ether groups.

2. A dispersion as claimed in claim 1, characterized in that the block copolymer corresponds to the formula (I)

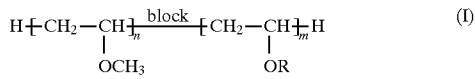

wherein

R is an organic residual group which is adsorbed onto the surface of the particles, n=10–10,000, m=2–500, and the ratio of n:m ranges between 1:1 and 500:1.

3. A dispersion as claimed in claim 2, characterized in that the block copolymer corresponds to the formula (I), wherein m and n have the above-mentioned meaning and R is a hydrocarbon group which may optionally be substituted with an acid residue or salts thereof, a substituted or unsubstituted amino group, a heterocyclic group having at least one nitrogen atom in the ring structure, an alkoxy group or an aryloxy group.

4. A dispersion as claimed in claim 3, characterized in that R is an aliphatic carboxylic acid group having 1–20 C-atoms.

* * * * *